(12) United States Patent
Zhou et al.

(10) Patent No.: US 10,291,838 B2
(45) Date of Patent: May 14, 2019

(54) FOCUSING POINT DETERMINING METHOD AND APPARATUS

(71) Applicants: BEIJING KUANGSHI TECHNOLOGY CO., LTD., Beijing (CN); PINHOLE (BEIJING) TECHNOLOGY CO., LTD., Beijing (CN)

(72) Inventors: Shuchang Zhou, Beijing (CN); Cong Yao, Beijing (CN); Xinyu Zhou, Beijing (CN); Weiran He, Beijing (CN); Dieqiao Feng, Beijing (CN); Qi Yin, Beijing (CN)

(73) Assignees: BEIJING KUANGSHI TECHNOLOGY CO., LTD., Beijing (CN); PINHOLE (BEIJING) TECHNOLOGY CO., LTD., Beijing (CN)

( * ) Notice: Subject to any disclaimer, the term of this patent is extended or adjusted under 35 U.S.C. 154(b) by 56 days.

(21) Appl. No.: 15/443,666

(22) Filed: Feb. 27, 2017

(65) Prior Publication Data
US 2017/0374268 A1 Dec. 28, 2017

(30) Foreign Application Priority Data
Jun. 28, 2016 (CN) .......................... 2016 1 0493585

(51) Int. Cl.
*G06K 9/32* (2006.01)
*G06K 9/46* (2006.01)
(Continued)

(52) U.S. Cl.
CPC ....... *H04N 5/23212* (2013.01); *G06K 9/3233* (2013.01); *G06K 9/46* (2013.01); *G06K 9/66* (2013.01); *H04N 5/23229* (2013.01)

(58) Field of Classification Search
CPC ............. G06F 19/321; G06F 17/30247; G06F 17/3025; G06F 17/30259
(Continued)

(56) References Cited

U.S. PATENT DOCUMENTS 6,266,442 B1 * 7/2001 Laumeyer .......... G06K 9/00818
382/104
6,449,384 B2 * 9/2002 Laumeyer .......... G06K 9/00818
382/104
(Continued)

FOREIGN PATENT DOCUMENTS

CN 101071252 11/2007
CN 103955718 7/2014
(Continued)

OTHER PUBLICATIONS

Chinese Office Action issued in the corresponding Chinese patent application No. 201610493585.4, dated Jul. 9, 2018, 17 pages.

*Primary Examiner* — Yosef Kassa
(74) *Attorney, Agent, or Firm* — Hamre, Schumann, Mueller & Larson, P.C.

(57) ABSTRACT

There are provided a focusing point determining method and apparatus. The focusing point determining method comprises: obtaining a view-finding image within a view-finding coverage; identifying a significance area in the view-finding image; and extracting at least one focusing point from the identified significance area. By identifying the significance area in the view-finding image and extracting at least one focusing point from the identified significance area, the focusing point determining method and apparatus can ensure accuracy of a selected focusing point to a certain extent, so as to ensure accuracy of focusing.

18 Claims, 6 Drawing Sheets

(51) Int. Cl.
  *G06K 9/66* (2006.01)
  *H04N 5/232* (2006.01)
(58) Field of Classification Search
  USPC ....... 382/103, 156, 159, 190, 282, 291, 305;
  348/47, 49, 143, 174
  See application file for complete search history.

(56) References Cited

U.S. PATENT DOCUMENTS

| | | | | |
|---|---|---|---|---|
| 7,634,187 B2 * | 12/2009 | Li | ............ | H04N 5/23212 348/351 |
| 7,936,384 B2 * | 5/2011 | Sawachi | ............ | H04N 5/232 348/240.1 |
| 8,026,975 B2 * | 9/2011 | Yasuda | ............ | H04N 5/23219 348/354 |
| 8,036,425 B2 * | 10/2011 | Hou | ............ | G06K 9/00771 348/169 |
| 8,176,426 B2 * | 5/2012 | Mitsuhashi | ............ | H04N 1/00198 386/285 |
| 8,289,439 B2 * | 10/2012 | Yasuda | ............ | G03B 13/32 348/349 |
| 8,471,951 B2 * | 6/2013 | Yasuda | ............ | G03B 13/32 348/349 |
| 8,553,037 B2 * | 10/2013 | Smith | ............ | G06T 13/40 345/473 |
| 8,879,813 B1 * | 11/2014 | Solanki | ............ | G06T 7/0014 382/128 |
| 9,131,141 B2 * | 9/2015 | Tinker | ............ | G06K 9/0061 |
| 2007/0263997 A1 | 11/2007 | Hirai et al. | | |

FOREIGN PATENT DOCUMENTS

| | | |
|---|---|---|
| CN | 105574813 | 5/2016 |
| CN | 105657240 | 6/2016 |
| JP | 2009-239754 | 10/2009 |

* cited by examiner

FOCUSING POINT DETERMINING METHOD AND APPARATUS

CROSS-REFERENCE TO RELATED APPLICATIONS

The present application claims the priority of a Chinese patent application No. 201610493585.4 filed on Jun. 28, 2016, the disclosure of which is incorporated herein by reference in its entirety.

TECHNICAL FIELD

The present disclosure relates to a field of automatic focusing technology, in particular to a focusing point determining method and apparatus.

BACKGROUND

At present, most of digital cameras and portable smart devices such as a smart phone, a tablet computer and so on which are equipped with a camera have an automatic focusing apparatus. It makes parts of an image nearby a focusing point area specified by a user sharper by means of adjusting a contrast ratio and so on.

However, since the focusing point is specified in advance by the user depending on his/her experience, it always results in low quality of a photographed image if the user is not sufficiently experienced. In addition, since different compositions require different focusing points, the user needs to switch among different focusing settings, which would influence seriously the user's operations such as snapping or the like. Additionally, when the user snaps an object which is moving quickly, it is very hard for him/her to finish the operation of focusing within a very short time. Additionally, in the case of focusing a further and smaller object, the circumstance that the focusing point specified by the user is inaccurate would occur easily.

Therefore, a method and apparatus being capable of determining the focusing point is needed.

SUMMARY

In view of the above, the present disclosure is proposed. There is provided in the present disclosure a focusing point determining method and apparatus.

According to one aspect of the present disclosure, there is provided a focusing point determining method, comprising: obtaining a view-finding image within a view-finding coverage; identifying a significance area in the view-finding image; and extracting at least one focusing point from the identified significance area.

According to another aspect, there is provided a focusing point determining apparatus, comprising: an image obtaining means, configured to obtain a view-finding image within a view-finding coverage; a significance area identifying means, configured to identify a significance area in the view-finding image; and a focusing point extracting means, configured to extract at least one focusing point in the identified significance area.

According to another aspect of the present disclosure, there is provided an electronic device, comprising: a processor, a storage unit storing program instructions, an input unit and a camera, wherein the input unit receives an instruction of photographing, the camera acquires a view-finding image within a view-finding coverage in response to the instruction of photographing, the following steps are performed when the program instructions stored in the storage unit are executed by the processor: obtaining the view-finding image within the view-finding coverage; identifying a significance area in the view-finding image; and extracting at least one focusing point from the identified significance area; and wherein the camera performs focusing operation according to at least one focusing point and photographs an image.

According to another aspect of the present disclosure, there is provided a storage medium upon which program instructions are stored. When being executed by a computer or a processor, the program instructions are configured to perform a focusing point determining method according to an embodiment of the present disclosure, and to implement a focusing point determining apparatus according to an embodiment of the present disclosure.

By identifying the significance area in the view-finding image and extracting at least one focusing point from the identified significance area, the focusing point determining method and apparatus according to the embodiments of the present disclosure can ensure accuracy of a selected focusing point to certain extent, so as to ensure accuracy of focusing. Further, the present disclosure determines the focusing point automatically by utilizing neural networks, which avoids complicated operations of selecting or switching the focusing point, is advantageous for the user to perform operations such as snapping, and can avoid focusing error caused by the user's false operation.

BRIEF DESCRIPTION OF THE DRAWINGS

Embodiments of the present disclosure will be described in detail by combining with the accompanying drawings. The above or other purposes, features and advantages of the present disclosure would become more evident. The accompanying drawings are used to help a reader further understanding the embodiments of the present disclosure, form a part of the specification, are used to explain the present disclosure together with the embodiments of the present disclosure, and thus do not form a limitation to the present disclosure. In the accompanying drawings, same reference marks generally represent same means or steps.

DETAILED DESCRIPTION

In order to make the purpose, technical solutions and benefits of the present disclosure more evident, exemplary embodiments of the present disclosure will be described in detail by referring to accompanying drawings. Obviously, the embodiments described below are just a part of embodiments of the present disclosure, but not all of embodiments of the present disclosure. It shall be understood that the present disclosure is not limited to the exemplary embodiments described herein. Based on the embodiments described in the present disclosure, all of other embodiments obtained by those skilled in the art without paying any inventive labor shall fall into the protection scope of the present disclosure.

Figure 1:
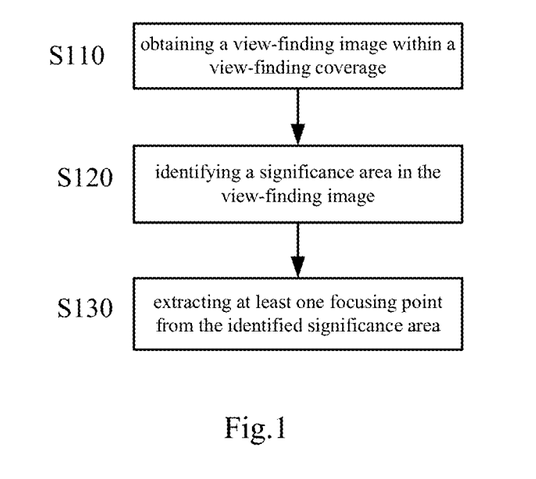
FIG. 1 is a schematic flowchart of a focusing point determining method according to an embodiment of the present disclosure.

First, a focusing point determining method 100 used to implement an embodiment of the present disclosure is described by referring to FIG. 1. According to the embodiment of the present disclosure, the focusing point determining method can be implemented at a cloud or implemented at a portable smart device equipped with a camera.

Figure 4A:
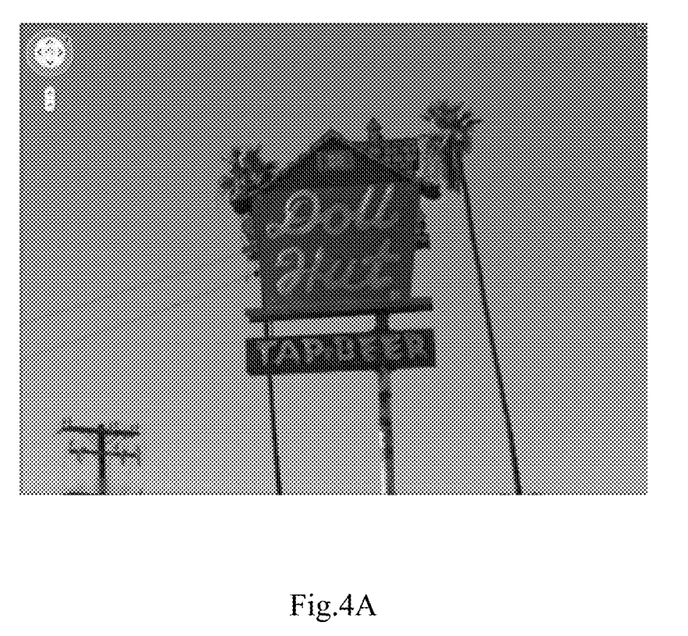
FIGS. 4A, 4B, 4C and 4D are a view-finding image, a significance identifying picture, a binarized significance picture and a focusing point determining picture respectively according to an embodiment of the present disclosure.

In step S110, a view-finding image within a view-finding coverage is obtained. As shown in FIG. 4A, it is a view-finding image obtained by the focusing point determining method 100 according to the embodiment of the present disclosure, i.e., an input image.

In step S120, a significance area in the view-finding image is identified. According to an example of the embodiment of the present disclosure, the significance area in the view-finding image is identified by utilizing a machine learning model, for example, identifying the significance area in the view-finding image by utilizing neural networks. Through model training, it makes that the neural network is capable of learning which objects in the picture have a higher significance. For example, it is generally recognized that human beings and cars have a higher significance than walls, sky, grasslands, and distance buildings. In addition, the significance area can be identified by utilizing other methods (for example, key area focusing method, etc.), to which no limitation is given. Herein, compared with other methods of identifying the significance area, the method of identifying the significance area by using the machine learning model for example neural networks can make operation of identifying more intelligent.

In addition, according to the embodiment of the present disclosure, a variety of models can be trained available for the user's selection depending on different significance definitions, for example, a significance model of "human face first", a significance model of "text first" and so on.

In step S130, at least one focusing point is extracted from the identified significance area.

In the case of implementing the focusing point determining method at the portable smart device, a camera equipped on the portable smart device acquires the view-finding image within the view-finding coverage, and then the camera performs focusing on the view-finding coverage by using the focusing point extracted in step S130 and photographs an image.

In the case of implementing the focusing point determining method at the cloud, the camera equipped on the portable smart device acquires the view-finding image within the view-finding coverage, the portable smart device transmits the view-finding image to the cloud, i.e., the cloud obtains in step S110 the view-finding image within the view-finding coverage, the cloud transits the focusing point extracted in step S130 to the portable smart device, and then the camera equipped on the portable smart device performs focusing according to the focusing point and photographing an image.

In the embodiment of the present disclosure, in the process of performing focusing on the view-finding coverage by utilizing the extracted focusing point, selection of the focusing point can be realized automatically by the smart device. Automatic selection of the focusing point can avoid complicated operations of selecting or switching the focusing point, is advantageous for a photographer to perform operations of snapping and so on, and avoid focusing mistake caused by false operation of the photographer. However, in a specific example, the focusing point can be selected by the photographer through operation. By selecting the focusing point voluntarily, the operator can select the focusing point according to the actual requirement or personal preference, which is helpful to photograph an image satisfied by the photographer.

According to an embodiment of the present disclosure, by determining a focusing point automatically, it avoids the complicated operation of selecting or switching the focusing point, is advantageous for the user to perform operation of snapping, and can avoid focusing mistake caused by the user's false operation.

Figure 2:
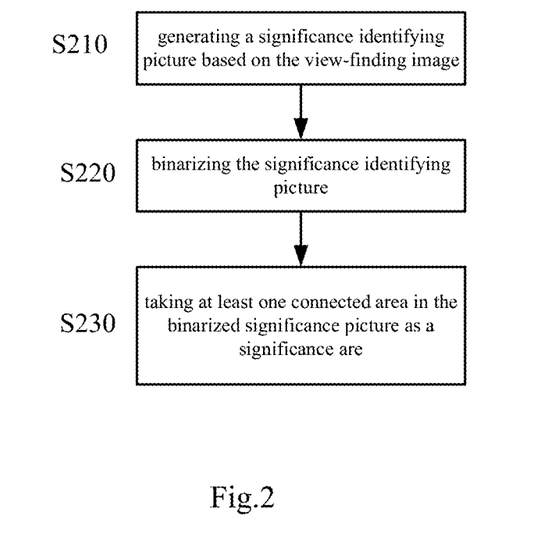
FIG. 2 is a schematic flowchart of identifying a significance area in a view-finding image according to an embodiment of the present disclosure.

FIG. 2 is a schematic flowchart of identifying a significance area in a view-finding image according to an embodiment of the present disclosure.

In step S210, a significance identifying picture is generated based on a view-finding image. In the significance identifying picture, a gray scale value of each pixel represents significance of this pixel.

According to the embodiment of the present disclosure, an image domain gradient of the view-finding image can be calculated by using neural networks. Then, the significance identifying picture is generated according to the image domain gradient.

Figure 4B:
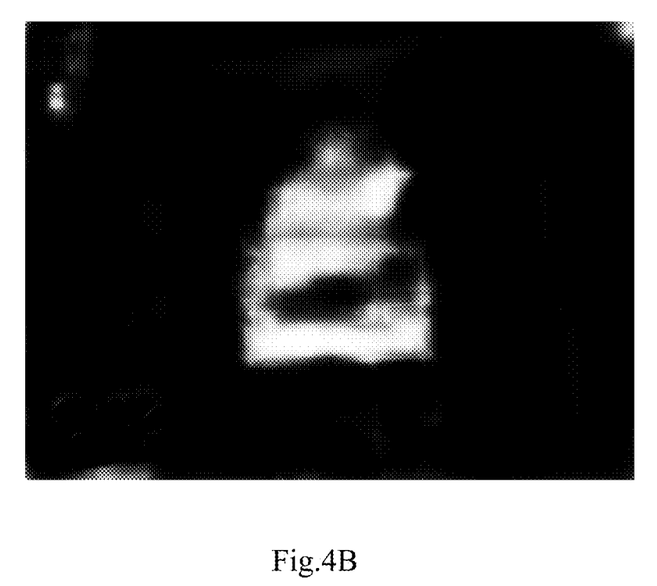

As shown in FIG. 4B, it is the significance identifying picture generated based on the view-finding image as shown in FIG. 4A according to the embodiment of the present disclosure.

Figure 4C:
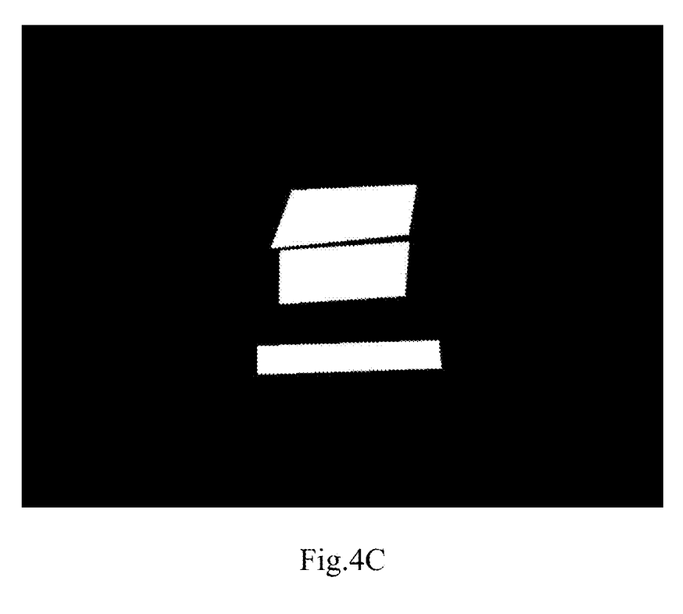

In step S220, the significance identifying picture is binarized to obtain a binarized significance picture. As shown in FIG. 4c, it is a binarized significance picture generated based on the view-finding image as shown in FIG. 4A according to the embodiment of the present disclosure.

In step S230, at least one connected area in the binarized significance picture is taken as a significance area. The binarized significance picture as shown in FIG. 4C comprises three connected areas. These three connected areas are taken as the significance area in the view-finding image as shown in FIG. 4A.

Figure 4D:
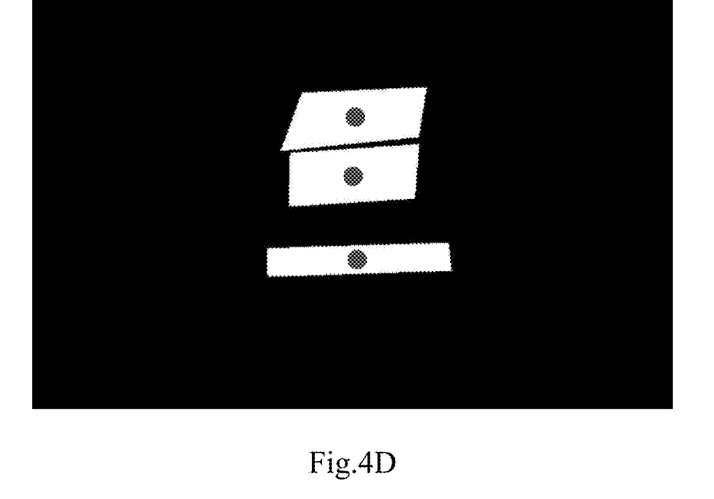

After the significance area in the view-finding image is identified, one focusing point is extracted for each connected area in the binarized significance picture. As an example, for each connected area in the binarized significance picture, an average value of coordinates of respective points in the connected area is calculated, and the average value is taken as a coordinate of the focusing point corresponding to the connected area. As shown in FIG. 4D, focusing points extracted based on the view-finding image in FIG. 4A according to the embodiment of the present disclosure are shown.

According to an embodiment of the present disclosure, in the case of photographing continuously, for each frame of image, focusing points must be firstly determined, and then focusing is performed according to the determined focusing points. In this case, a smoothing operation can be performed on a currently predicted focusing point by using information of its historical focusing point.

Figure 3:
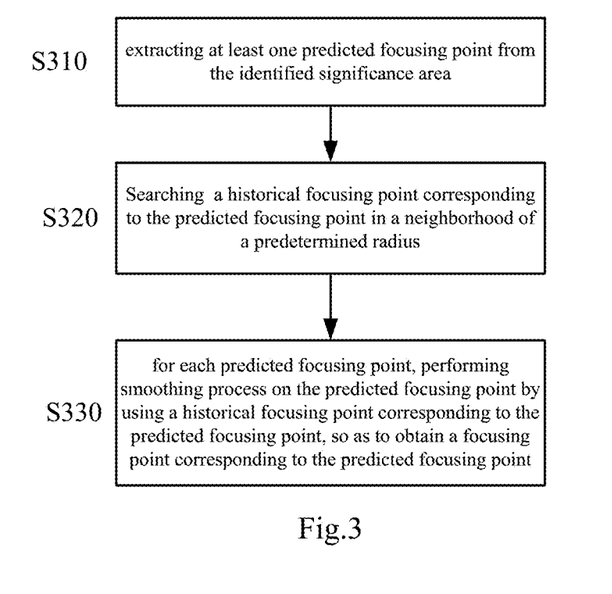
FIG. 3 is schematic flowchart of extracting a focusing point in the case of photographing images continuously according to a first embodiment of the present disclosure.

As shown in FIG. 3, it is a schematic flowchart of extracting the focusing point in the case of photographing images continuously.

In step S310, at least one predicted focusing point is extracted from the identified significance area. As an example, the identified significance area comprises at least one connected area, and one predicted focusing point is extracted from each connected area. For example, an average value of coordinates of respective points in the connected area can be calculated, and the average vale is taken as a coordinate of a predicted focusing point corresponding to the connected area.

In step S320, for each predicted focusing point, a historical focusing point corresponding to this predicted focusing point is searched in a neighborhood of a predetermined radius taking the predicted focusing point as a center, the historical focusing point being a focusing point based on which photographing is performed last time.

In step S330, for each predicted focusing point, smoothing process is performed on the predicted focusing point by using the historical focusing point corresponding to the predicted focusing point, so as to obtain a focusing point corresponding to the predicted focusing point.

As an example, n predicted focusing points $q1, q2, \ldots, qn$ are extracted from a current view-finding image, and m focusing points $p1, p2, \ldots, pm$ are adopted in the most recently photographing. For each predicted focusing point $qi$, a historical focusing point corresponding thereto is searched in the neighborhood of a radius r. If, for one predicted focusing point, no historical focusing point corresponding thereto is found in the neighborhood of the radius r, then this predicted focusing point is taken directly as a focusing point. If for one predicted focusing point, a historical focusing point corresponding thereto is found in the neighborhood of the radius r, then smoothing process is performed on the predicted focusing point by using this historical focusing point.

For example, for the predicted focusing point $qi$, a historical focusing point $pj$ is found in the neighborhood of the radius r, smoothing process can be performed in the following mode: $qi'=a*qi+(1-a)*pj$, where a is a smoothing coefficient, whose value can be within a range of 1-0.7, for example, the specific value of a can be for example 0.9, 0.8, etc.

According to an embodiment of the present disclosure, selection of a focusing point based on the significance area given by neural networks can not only realize selection of a focusing point based on human face detection, but also realize selection of a focusing point based on text detection and selection of a focusing point based on object detection and so on.

Figure 5:
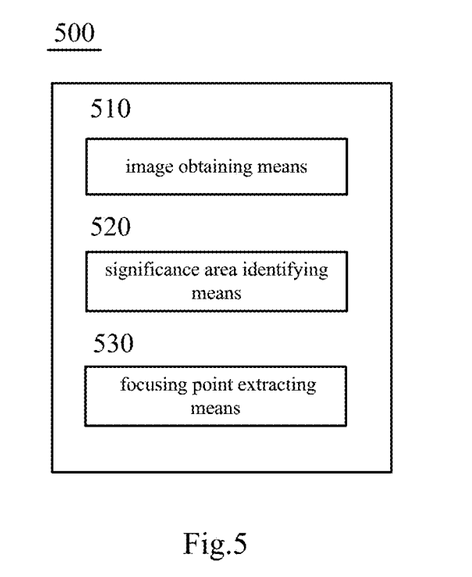
FIG. 5 is a schematic block diagram of a focusing point determining apparatus according to an embodiment of the present disclosure.

FIG. 5 is a schematic block diagram of a focusing point determining apparatus according to an embodiment of the present disclosure. The focusing point apparatus according to an embodiment of the present disclosure can be implemented at a portable smart device equipped with a camera, or can be implemented at the cloud.

The focusing point determining apparatus 500 according to the embodiment of the present disclosure comprises an image obtaining means 510, a significance area identifying means 520 and a focusing point extracting means 530.

The image obtaining means 510 is configured to obtain a view-finding image within a view-finding coverage. The image obtaining means 510 can obtain this view-finding image from the camera of the portable smart device.

The significance area identifying means 520 is configured to identify a significance area in the view-finding image. According to the embodiment of the present disclosure, the significance area identifying means 520 identifies the significance area in the view-finding image by using a machine learning model. As an example, the significance area identifying means 520 utilizes the neural networks to identify the significance area in the view-finding image.

The focusing point extracting means 530 is configured to extract at least one focusing point from the identifier significance area.

In the case of implementing the focusing point determining apparatus 500 at the portable smart device, the camera equipped on the portable smart device acquires the view-finding image within the view-finding coverage. The image obtaining means 510 obtains the view-finding image acquired by the camera, and the focusing point extracting means 530 feeds back at least one extracted focusing point to the camera, and then the camera performs focusing on the view-finding coverage according to the at least one focusing point and photographs an image.

In the case of implementing the focusing point determining apparatus 500 at the cloud, the camera equipped on the portable smart device acquired the view-finding image within the view-finding coverage, the portable smart device transmits the view-finding image to the image obtaining means 510 implemented at the cloud, and the cloud transmits the at least focusing point extracted by the focusing point determining apparatus 500 to the portable smart device, and then the camera equipped on the portable smart device performs focusing according to the at least one focusing point and photographs an image.

Figure 6:
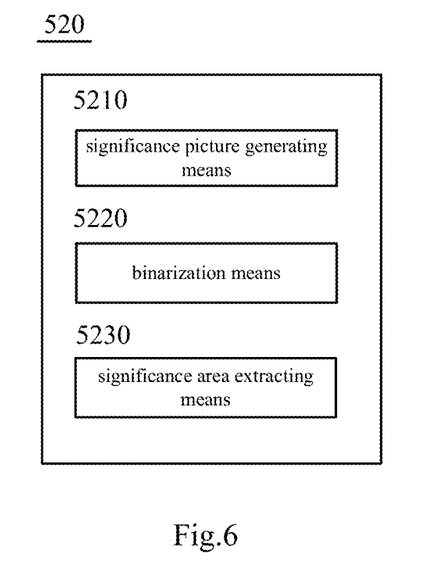
FIG. 6 is a schematic block diagram of a significance area identifying means according to an embodiment of the present disclosure.

FIG. 6 is a schematic block diagram of a significance area identifying means according to an embodiment of the present disclosure.

The significance area identifying means 520 comprises a significance picture generating means 5210, a binarization means 5220 and a significance area extracting means 5230.

The significance picture generating means 5210 is configured to generate a significance identifying picture based on a view-finding image, wherein in the significance identifying picture, a gray scale value of each pixel represents significance of this pixel.

According to an embodiment of the present disclosure, the significance picture generating means 5210 can calculate an image domain gradient of the view-finding image by using neural networks, and generate the significance identifying picture according to the image domain gradient. As shown in FIG. 4B, it is the significance identifying picture generated by the significance picture generating means 5210 based on the view-finding image as shown in FIG. 4A.

The binarization means 5220 is configured to binarize the significance identifying picture to obtain a binarized significance picture. As shown in FIG. 4C, it is a binarized significance picture.

The significance area extracting means 5230 is configured to take at least one connected area in the binarized significance picture as a significance area. The binarized significance picture as shown in FIG. 4C comprises three connected areas, which are taken as the significance area in the view-finding image as shown in FIG. 4A.

For each connected area in the binarized significance picture, the focusing point extracting means 530 extracts one focusing point. As an example, for each connected area in the binarized significance picture, the focusing point extracting means 530 calculates an average value of coordinates of respective points in the connected area, and the average value is taken as a coordinate of the focusing point corresponding to the connected area. As shown in FIG. 4D, focusing points extracted from the view-finding image are shown.

According to the embodiment of the present disclosure, in the case of photographing continuously, focusing points shall be firstly determined for each frame of image, and then focusing is performed according to the determined focusing points. In this case, smoothing operation can be performed on a currently predicted focusing point by using information of a historical focusing point.

Figure 7:
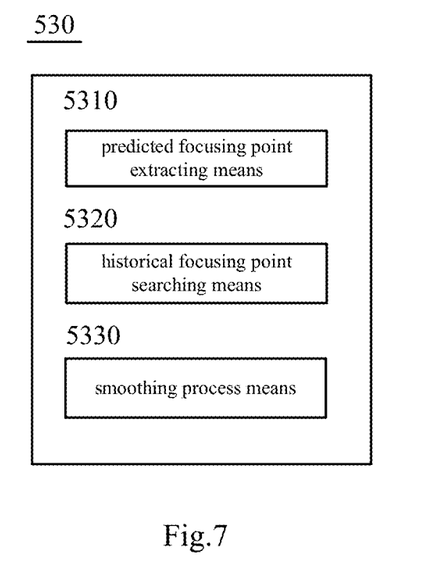
FIG. 7 is a schematic block diagram of a focusing point extracting means according to an embodiment of the present disclosure.

As shown in FIG. 7, it is a schematic block diagram of a focusing point extracting means according to an embodiment of the present disclosure.

The focusing point extracting means 530 comprises a predicted focusing point extracting means 5310, a historical focusing point searching means 5320, and a smoothing process means 5330.

The predicted focusing point extracting means 5310 is configured to extract at least one predicted focusing point from the identified significance area. As an example, the identified significance area comprises at least one connected area, and the predicted focusing point extracting means 5310 extracts one predicted focusing point in each connected area. The identified significance area can be a significance area identified in the binarized significance picture. For example, for each connected area, the predicted focusing point extracting means 5310 can calculate an average value of coordinates of respective points in the connected area, and take the average value as a coordinate of the predicted focusing point corresponding to the connected area.

The historical focusing searching means 5320 is configured to for each predicted focusing point, search a historical focusing point corresponding to the predicted focusing point in a neighborhood of a predetermined radius which takes the predicted focusing point as a center, the historical focusing point is the focusing point based on which photographing is performed last time.

For each predicted focusing point, in the case of finding a historical focusing point corresponding to the predicted focusing point, the smoothing process means 5330 performs smoothing process on the predicted focusing point by using the historical focusing point corresponding to this predicted focusing point, so as to obtain a focusing point corresponding to the predicted focusing point.

As an example, n predicted focusing points $q1, q2, \ldots, qn$ are extracted from a current view-finding image, and m focusing points $p1, p2, \ldots, pm$ are adopted in the most recently photographing. For each predicted focusing point $qi$, a historical focusing point corresponding thereto is searched in the neighborhood of a radius r. If, for one predicted focusing point, no historical focusing point corresponding thereto is found in the neighborhood of the radius r, then this predicted focusing point is taken directly as a focusing point. If, for one predicted focusing point, a historical focusing point corresponding thereto is found in the neighborhood of the radius r, then smoothing process is performed on the predicted focusing point by using this historical focusing point.

For example, for the predicted focusing point $qi$, a historical focusing point $pj$ is found in the neighborhood of the radius r, smoothing process can be performed in the following mode: $qi'=a*qi+(1-a)*pj$, where a is a smoothing coefficient, whose value can be within a range of 1-0.7, for example, the specific value of a can be for example 0.9, 0.8, etc.

According to an embodiment of the present disclosure, selection of a focusing point based on the significance area given by neural networks can not only realize selection of a focusing point based on human face detection, but also realize selection of a focusing point based on text detection and selection of a focusing point based on object detection and so on.

Figure 8:
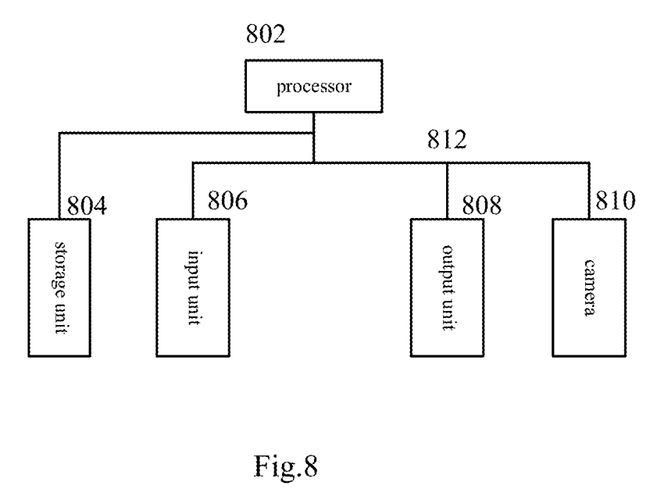
FIG. 8 is a schematic block diagram of an electronic device 800 according to an embodiment of the present disclosure.

As shown in FIG. 8, it is a schematic block diagram of an electronic device 800 according to an embodiment of the present disclosure.

The electronic device 800 comprises one or more processors 802, one or more storage units 804, an input unit 806, an output unit 808, and a camera 810. These components are connected with each other through a bus system 812 and/or other forms of connecting mechanism (not shown). It shall be noted that the components and structure of the portable smart device 800 as shown in FIG. 8 are just for illustration, but not for limitation. The electronic device 800 may also have other components and structures according to the requirement.

The processor 802 can be a central processing unit or other forms of processing unit having data processing capacity and/or instruction executing capacity, and can control other components in the electronic device 800 to execute desired functions.

The storage unit 804 can comprise one or more computer program products. The computer program products can comprise various forms of computer readable storage medium, for example, volatile memory and/or non-volatile memory. The volatile memory can for example comprise a random access memory and/or a cache or the like. The non-volatile memory can for example comprise a read-only memory, a harddisk, a flash memory, etc. one or more computer program instructions can be stored on the computer readable medium. The processor 802 can run the program instruction, so as to realize the focusing point determining function and/or other desired function (implemented by the processor) in the embodiment of the present disclosure described above. Various application programs and various data can be stored in the computer readable storage medium, for example, various data used and/or produced by the application program.

The input unit 806 can be a unit used by the user to input an instruction, and can comprise one or more of a keyboard, a mouse, a microphone and touch screen and so on.

The output unit 808 can output various information (for example, image or sound) to the outside (for example, a user), and can comprise one or more of display and loudspeaker and so on.

The camera 810 can photograph an image, and store the photographed image in the storage unit 840 for the use by other components.

According to the embodiment of the present disclosure, the user sends an instruction of photographing to the camera 810 through the input unit 806, and then the camera 810 acquires the view-finding image within the view-finding coverage.

According to the embodiment of the present disclosure, the focusing point determining method 100 according to the embodiment of the present disclosure is performed and the focusing point determining apparatus 500 is realized according to an embodiment of the present disclosure through the processor 802 executing the program instructions stored in the storage unit 804.

According to the embodiment of the present disclosure, in each process of photographing, after the focusing point is determined, the determined focusing point would be stored in the storage unit 804 for use when performing smoothing process on the focusing point in the next photographing, that is, for providing the historical focusing point information for the next photographing.

The electronic device 800 can be a camera, or can be a portable smart device equipped with a camera, for example, a smart phone, a tablet computer, a notebook computer, etc.

In addition, according to the embodiment of the present disclosure, there is further provided a cloud device comprising one or more processors and one or more storage units. Program instructions are stored in the storage unit. When being executed by the processor, the program instructions are configured to perform corresponding steps of the focusing point determining method in the embodiment of the present disclosure, and to implement the corresponding units of the focusing point determining apparatus in the embodiment of the present disclosure.

In addition, according to the embodiment of the present disclosure, there is further provided a storage medium, upon which program instructions are stored. When being executed by the computer or the processor, the program instructions are configured to perform corresponding steps of the focusing point determining method in the embodiment of the present disclosure, and to implement the corresponding units of the focusing point determining apparatus in the embodiment of the present disclosure. The storage medium can for example comprise a memory card of a smart phone, a storage means of a tablet computer, a harddisk of a personal computer, a read-only-memory (ROM), an erasable programmable read-only memory (EPROM), a portable compact disk read-only memory (CD-ROM), a USB memory, or any combination of the above storage medium.

Through identifying the significance area in the view-finding image and extracting at least focusing point from the identified significance area, the focusing point determining method and apparatus, compared with the conventional method of specifying a focusing point in advance artificially, the electronic device and the storage medium according to the embodiment of the present disclosure can ensure accuracy of the selected focusing point to a certain extent, so as to guarantee accuracy of focusing. Moreover, the focusing point can be determined automatically by using the neural networks, which avoids complicated operations of selecting or switching the focusing point, is advantageous for a photographer to perform operations of snapping and so on, an avoid focusing mistake caused by false operation of the photographer.

Although exemplary embodiments are already described herein by referring to the accompanying drawings, it shall be understood that the above exemplary embodiments are just for illustration, and it does not intend to limit the scope of the present disclosure hereto. Those ordinary skilled in the art can make various modifications and amendments, without departing from the scope and spirit of the present disclosure. All of these modifications and amendments intend to be included within the scope of the present disclosure claimed in the Claims.

What is claimed is:

1. A focusing point determining method, comprising:
obtaining a view-finding image within a view-finding coverage;
identifying a significance area in the view-finding image; and
extracting at least one focusing point from the identified significance area,
wherein said identifying the significance area in the view-finding image comprises:
generating a significance identifying picture based on the view-finding image, wherein in the significance identifying picture, a gray scale value of each pixel represents significance of the pixel;
binarizing the significance identifying picture to obtain a binarized significance picture; and
taking at least one connected area in the binarized significance picture as the significance area.

2. The focusing point determining method according to claim 1, wherein the significance area in the view-finding image is identified by utilizing neural networks.

3. The focusing point determining method according to claim 1, wherein said generating a significance identifying picture based on the view-finding image comprises:
calculating an image domain gradient of the view-finding image by using neural networks; and
generating the significance identifying picture according to the image domain gradient.

4. The focusing point determining method according to claim 1, wherein said extracting at least one focusing point from the identified significance area comprises:
extracting one focusing point for each connected area in the binarized significance picture.

5. The focusing point determining method according to claim 4, wherein said extracting one focusing point for each connected area in the binarized significance picture comprises: calculating an average value of coordinates of respective points in the connected area, and taking the average value as a coordinate of the focusing point corresponding to the connected area.

6. The focusing point determining method according to claim 1, wherein said extracting at least one focusing point from the identified significance area comprises:
extracting at least one predicted focusing point from the identified significance area;
for each predicted focusing point, searching a historical focusing point corresponding to the predicted focusing point in a neighborhood of a predetermined radius which takes the predicted focusing point as a center, the historical focusing point being the focusing point based on which photographing is performed last time; and
for each predicted focusing point, in the case of finding a historical focusing point corresponding to the predicted focusing point, performing smoothing process on the predicted focusing point by using the historical focusing point corresponding to the predicted focusing point, so as to obtain a focusing point corresponding to the predicted focusing point.

7. The focusing point determining method according to claim 6, wherein said extracting at least one focusing point from the identified significance area comprises:
extracting one predicted focusing point for each connected area in the binarized significance picture.

8. The focusing point determining method according to claim 7, wherein said extracting one focusing point for each connected area in the binarized significance picture comprises: calculating an average value of coordinates of respective points in the connected area, and taking the average value as a coordinate of the predicted focusing point corresponding to the connected area.

9. The focusing point determining method according to claim 1, further comprising:

performing focusing operation on the view-finding coverage by using the extracted focusing point and photographing an image.

10. A focusing point determining apparatus, comprising:
an image obtaining means, configured to obtain a view-finding image within a view-finding coverage;
a significance area identifying means, configured to identify a significance area in the view-finding image; and
a focusing point extracting means, configured to extract at least one focusing point in the identified significance area,
wherein the significance area identifying means comprises:
a significance picture generating means, configured to generate a significance identifying picture based on the view-finding image, wherein in the significance identifying picture, a gray scale value of each pixel represents significance of the pixel;
a binarization means, configured to binarize the significance identifying picture to obtain a binarized significance picture; and
a significance area extracting means configured to take at least one connected area in the binarized significance picture as a significance area.

11. The focusing point determining apparatus according to claim 10, wherein the significance area identifying means identifies the significance area in the view-finding image by utilizing neural networks.

12. The focusing point determining apparatus according to claim 10, wherein significance picture generating means calculates an image domain gradient of the view-finding image by using neural networks, and generates the significance identifying picture according to the image domain gradient.

13. The focusing point determining apparatus according to claim 10, wherein for each connected area in the binarized significance picture, the focusing point extracting means extracts one focusing point.

14. The focusing point determining apparatus according to claim 13, wherein for each connected area in the binarized significance picture, the focusing point extracting means calculates an average value of coordinates of respective points in the connected area, and takes the average value as a coordinate of the focusing point corresponding to the connected area.

15. The focusing point determining apparatus according to claim 10, wherein the focusing point extracting means comprises:
a predicted focusing point extracting means, configured to extract at least one predicted focusing point from the identified significance area;
a historical focusing point searching means, configured to for each predicted focusing point, search a historical focusing point corresponding to the predicted focusing point in a neighborhood of a predetermined radius which takes the predicted focusing point as a center, the historical focusing point being the focusing point based on which photographing is performed last time; and
a smoothing process means, configured to for each predicted focusing point, in the case of finding a historical focusing point corresponding to the predicted focusing point, perform smoothing process on the predicted focusing point by using the historical focusing point corresponding to the predicted focusing point, so as to obtain a focusing point corresponding to the predicted focusing point.

16. The focusing point determining apparatus according to claim 15, wherein for each connected area in the binarized significance picture, the predicted focusing point extracting means extracts one predicted focusing point.

17. The focusing point determining apparatus according to claim 16, wherein for each connected area in the binarized significance picture, the predicted focusing point extracting means calculates an average value of coordinates of respective points in the connected area, and takes the average value as a coordinate of the predicted focusing point corresponding to the connected area.

18. The focusing point determining apparatus according to claim 10, further comprising: performing focusing operation on the view-finding coverage by using the extracted focusing point and photographing an image.

* * * * *